United States Patent

Littlejohn

[15] 3,649,199
[45] Mar. 14, 1972

[54] METHOD FOR DETECTING TRACE QUANTITIES OF AN ORGANIC DRUG MATERIAL IN A LIVING ANIMAL

[72] Inventor: Duane P. Littlejohn, Santa Clara, Calif.
[73] Assignee: Varian Associates, Palo Alto, Calif.
[22] Filed: Mar. 26, 1970
[21] Appl. No.: 22,940

[52] U.S. Cl. ...................23/230 B, 23/230 R, 23/232 R, 55/16, 128/2.07, 128/2 R, 250/41.9 G
[51] Int. Cl. ...................................................G01n 33/16
[58] Field of Search ...............55/158, 197, 16; 23/230 B, 23/230 R, 232; 250/41.9 G; 128/2.07

[56] References Cited

UNITED STATES PATENTS

| 3,398,505 | 8/1968 | Llewellyn | 55/197 X |
| 3,421,292 | 1/1969 | Llewellyn | 55/197 X |
| 3,429,105 | 2/1969 | Llewellyn | 55/197 X |

OTHER PUBLICATIONS

S. Woldring et al., Science, 153, 885–887 (1966).

Primary Examiner—Morris O. Wolk
Assistant Examiner—Sidney Marantz
Attorney—Stanley Z. Cole, Vincent W. Cleary and Harry E. Aine

[57] ABSTRACT

A method for detecting trace quantities of organic drug material in a living animal under observation wherein samples of gaseous material effusing from the animal either by way of breath, through the skin or from a blood stream are passed through a three-stage membrane gas separator to enrich the concentration of the organic drug material in the gaseous sample. The enriched sample gas output of the membrane separator is fed to a gas analyzer such as a mass spectrometer for detecting the organic drug material, if any, in the sample gas under analysis. The detection of trace quantities of drugs may be employed for monitoring the rate of metabolism and for ascertaining the various metabolites produced by metabolism of drugs in the body.

10 Claims, 2 Drawing Figures

INVENTOR
DUANE P. LITTLEJOHN 3,649,199

METHOD FOR DETECTING TRACE QUANTITIES OF AN ORGANIC DRUG MATERIAL IN A LIVING ANIMAL

DESCRIPTION OF THE PRIOR ART

Heretofore, it has been proposed to pass a sample of a patient's blood over a semipermeable membrane such that certain gases within the blood may diffuse through the membrane for passage to a mass spectrometer for monitoring the carbon dioxide and oxygen level in the blood. It has also been proposed to monitor the concentration of anesthetic in the blood by this method to permit the anesthesiologist to adjust the supply of anesthetic accordingly. It has also been proposed to pass a sample of the exhaled breath of he patient directly to a mass spectrometer for monitoring the level of oxygen and carbon dioxide in the breath. Such methods and apparatus are described in an article titled, "Medical Mass Spectrometer Connects Directly to Patient," appearing in the Nov. 8, 1968 issue of Design News.

The problem with this prior method and apparatus is that it is not suited for monitoring trace amounts of organic materials, as opposed to monitoring the relatively high concentrations of oxygen and carbon dioxide in the body because the background levels produced by permanent gases such as nitrogen, oxygen, carbon dioxide, hydrogen and water vapor are too high, thereby masking the very low trace concentrations of the organic drum materials which are desired to be detected.

It is also known from U.S. Pat. Nos. 3,455,092 and 3,429,105 to use a plurality of stages of membrane gas separators for enriching the organic material concentration in a sample of gas to be fed to a mass spectrometer.

SUMMARY OF THE PRESENT INVENTION

The principal object of the present invention is the provision of a novel method for detecting trace quantities of drug material in a living animal.

One feature of the present invention is the provision, in a method for detecting trace quantities of a drug material in a living animal under observation of the steps of, obtaining a sample of gaseous material effusing from the animal, passing the gaseous sample collected through first and second stages of a membrane gas separator for enriching the concentration of the drug vapors, if any, in the gaseous sample, and passing the enriched sample gas to a gas analyzer for detecting the drug material, if any, in the gaseous sample under analysis.

Another feature of the present invention is the same as the preceding feature wherein the gaseous samples to be analyzed are obtained over a period of time, such gases being analyzed over a period of time, and the detected amount of the drug material being correlated with time, whereby useful information concerning drug absorption, excretion, metabolism rates, metabolites and the like can be ascertained.

Another feature of the present invention is the same as any one or more of the preceding features wherein the sample gaseous material is obtained from the exhaled breath of the animal.

Another feature of the present invention is the same as any one or more of the preceding features wherein the sample of gaseous material is obtained from a region immediately adjacent to the skin of the animal.

Another feature of the present invention is the same as any one or more of the preceding features wherein the membrane separator includes a three-stage membrane separator, and a pump is connected between the second and third stage of the separator for pumping water vapor at a rate which exceeds the pumping speed for the other constituents of the gas stream, whereby the water vapor concentration passing through the membrane separator to the gas analyzer is substantially reduced.

Other features and advantages of the present invention will become apparent upon perusal of the following specification taken in connection with the accompanying drawings wherein:

DESCRIPTION OF THE PREFERRED EMBODIMENTS

Figure 1:
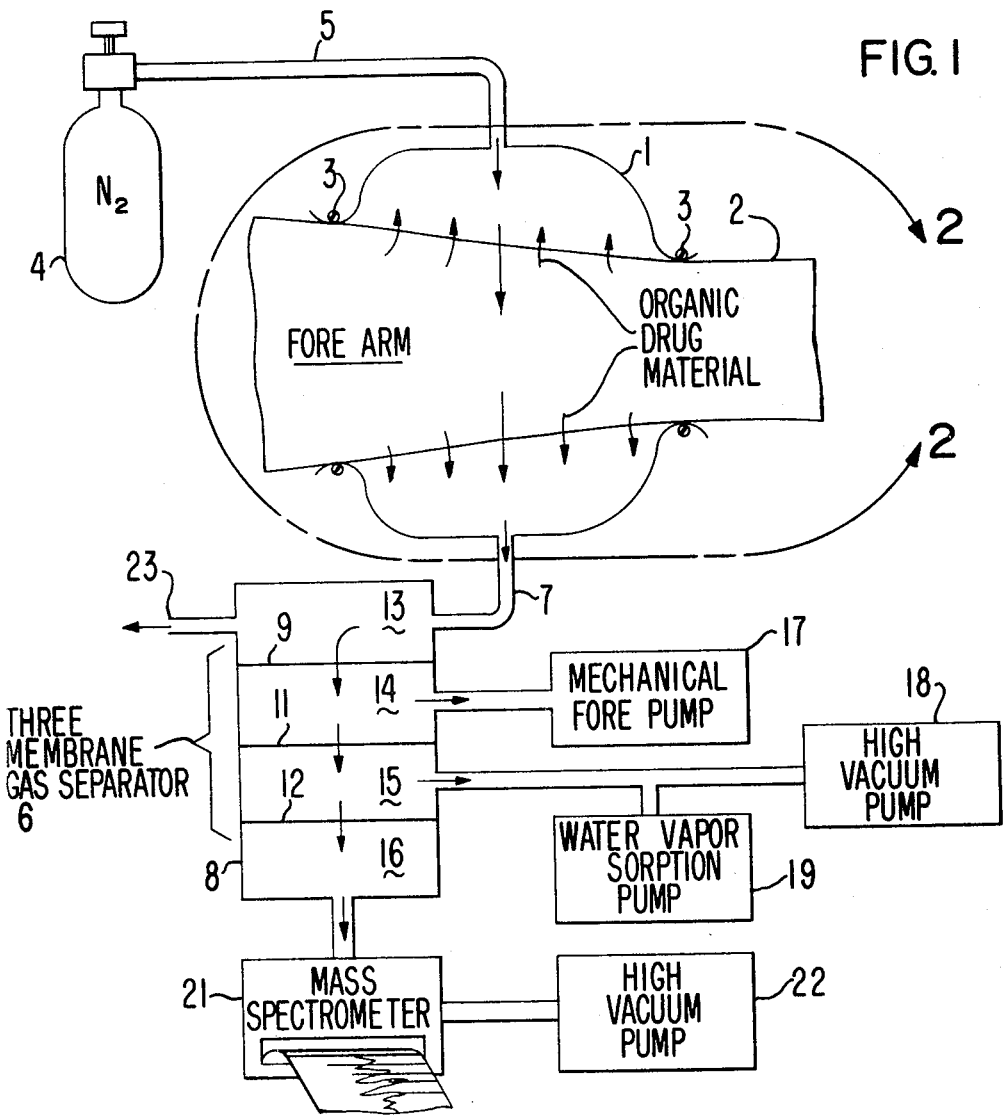
FIG. 1 is a schematic line diagram, partly in block diagram form, depicting an apparatus for practicing the method of the present invention.

Referring now to FIG. 1, there is shown an apparatus for practicing the method of the present invention. A gas impervious sleeve 1 is clamped to the forearm 2 of a person, to be put under observation by a pair of rubber bands 3, which clamp the sleeve 1 to the forearm in a gas tight manner. A carrier gas, such as nitrogen, helium, etc., is fed into the sleeve from a source of gas 4 via tabulation connecting into the sleeve 1. A three-stage membrane gas separator 6, generally of the type disclosed in the aforecited U.S. Pat. Nos. 3,429,105 and 3,455,092, is connected to the sleeve 1 via an output conduit 7.

The membrane separator 6 includes a gas conduit 8 having three relatively thin semipermeable membranes 9, 11, and 12 hermetically sealed across the conduit 8 to define an input region 13, an output region 16 and two interstage regions 14 and 15 defined by the spaces between adjacent membranes. The first interstage region 14 is exhausted via a mechanical forepump 17 to a moderately low pressure as of 0.1 to 10 torr partial pressure of the carrier gas constituent. The second interstage 15 is exhausted via a high vacuum pump 18 and a water vapor sorption pump 19 to a pressure of between 0.001 to 0.1 torr pressure of the carrier gas constituent. The water vapor sorption pump 19 may comprise a zeolite sorption pump for preferentially pumping water vapor at a much faster rate than it pumps the other gaseous constituents of the atmosphere in the interstage region 15. The zeolite water vapor sorption pump will hold water vapor at pressures of $10^{-6}$ to $10^{-7}$ torr at 25° C. and the purpose of the water vapor pump 19 is to remove the water vapor from the system to prevent passage of water vapor into the mass spectrometer 21 to prevent overloading of the spectrometer 21.

The output stage 16 of the membrane separator 6 is connected in gas communication with the input of a mass spectrometer 21, such as a sector mass spectrometer, cycloidal mass spectrometer or a quadrupole mass spectrometer. A suitable cycloidal mass spectrometer is the Varian Associates M–66 mass spectrometer equipped with a V–5570 multiplier detector. The mass spectrometer is evacuated to a relatively low pressure, as of $10^{-4}$ to $10^{-6}$ torr via a high vacuum pump 22, such as a getterion vacuum pump.

In practicing the method of the present invention, trace quantities of a drug material to be detected effuse from the body of the animal through the skin into the carrier gas stream passing through the sleeve 1. Drug materials which may have concentrations as low as one picogram ($10^{-12}$) per cc. of gas are passed through conduit 7 to the first membrane 9 of the membrane gas separator 6.

First membrane 9 is a semipermeable membrane which is relatively permeable to the drug material and relatively impermeable to permanent gases such as nitrogen, to enrich the concentration of the drug material, if any, in the gaseous sample passing through the first membrane 9. A specially suitable membrane material is a dimethyl silicone polymer formed into a membrane, as of one thousandth of an inch thick. The denuded carrier gas stream exits from the input stage 13 via a vent port 23.

The enriched gas stream passes into the first interstage region 14 with a drug vapor enrichment of between 100–1,000. In a similar manner, the second membrane 11, which is of the same composition and construction as the first membrane 9, passes the drug material vapors to the second interstage region 15 in preference to the carrier gas with a further enhancement in the enrichment of the drug vapor concentration by a factor of between 100–1,000.

In the second interstage region 15, the water vapor which has passed through the preceding membranes 9 and 11 is pumped via the water vapor sorption pump 19 in preference to the other gases to greatly reduce the concentration of water vapor in the sample gas stream which is to be passed through the third membrane 12.

Use of the water vapor sorption pump 19 to remove water vapor in detection systems utilizing a three-stage membrane separator 6 is disclosed and claimed in copending U.S. application Ser. No. 12,560 filed Feb. 19, 1970, and assigned to the same assignee as the present invention. The third membrane 12 has a similar composition and construction as the preceding two membranes 9 and 11. The sample gases passing through the third membrane 12 experience a further enrichment of the drug vapor concentration by a factor of between 100–1,000 such that the total enrichment of drug vapors passing from the input stage 13 to the output stage 16 is in the range of 1 million to 1 billion. Water vapor, which is typically present in the gas at the input stage 13 of the separator 6 at levels of about 0.5 to 1 percent by weight, is substantially eliminated in the output stage 16.

The enriched sample gas in the output stage 16 of the separator 6 passes to the input of the mass spectrometer 21 wherein the sample gas is analyzed for the organic materials or metabolites thereof.

As an alternative to the use of the plastic sleeve 1 for collecting gas vapors effusing from the forearm or other parts of the body, the animal may exhale directly into the input stage 13 of the gas separator 6.

In one example of the method of the present invention, a subject inhaled about six to eight deep breaths of ether vapor. The mass spectrometer 21 was set for monitoring the $m/e$ 59 fragment of diethyl ether. Sample gases were collected, in one instance, via the sleeve 1 and in a second instance by exhaling into the input stage 13 of the separator 6. The mass spectrometer 21 detected the $m/e$ fragment of diethyl ether in both instances. The $m/e$ fragment was still easily detectable in the exhaled breath samples after more than six hours after inhaling of the six to eight deep breaths of the ether.

In a similar example, the $m/e$ 45 and 46 fragments of ethanol were readily detected on breath samples and off the forearm of the subject after the ingestion of 110 ml. of whiskey. The intensity of these same mass spectral peaks was seen to increase abruptly $101 \pm 2$ seconds after ingestion of an additional 37 ml. of whiskey in a test during which the arm vapors were monitored in a continuous manner.

In another test, the $m/e$ 31 fragment of ethanol was monitored after the ingestion of two 0.25 g./kg. doses of ethanol administered at a 10-minute interval. The concentration of the ethanol vapors over the forearm experienced two peaks at about 35 minutes and 45 minutes, respectively, after ingestion of the alcohol. The ethanol concentration in the breath was found to be on the order of 10 times the concentration in gases effusing through the forearm.

The monitored concentration of drug material and/or metabolites of the drug, as a function of time following administration of the drug, yields useful information concerning the rate of absorption and the rate of excretion of the drug by the animal for various methods and routes of administration of the drug. This provides a method of measuring the biological equivalence of comparable drug or drug forms.

In another test, a single therapeutic dose, 250 mg. of methyl parafynol (Dormison) was also readily detected on the breath and off the forearm of the subject. Nicotine from a single cigarette was detected emanating from another subject enclosed in a large plastic bag extending from the neck to the waist. The method and apparatus of FIG. 1 is useful for detecting, both on the breath and over the forearm of human subjects, ethyl alcohol, diethyl ether, and methyl parafynol.

In addition, dimethyl sulfoxide was detected by the methods described, on the subject's breath having applied dimethyl sulfoxide to the skin of the forearm. The method and apparatus of the present invention is useful for detecting many different types of drugs among which are the following:

| | |
|---|---|
| chloral hydrate | phenobarbital |
| amphetamine | pentazocine |
| methamphetamine | DDT |
| propadrine | LSD |
| phenmetrazine | STP |
| chlorpromazine | DMT |
| fluphenazine | cocaine |
| methylparafynol | heroin |
| ethchlorvynol | opium |
| glutethimide | marijuana |
| paradione | hashish |
| secobarbital | |

Figure 2:
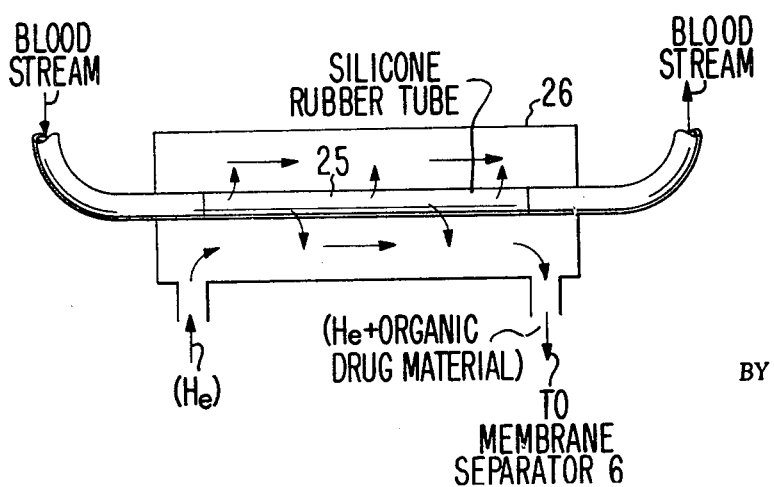
FIG. 2 is a schematic sectional view of an alternative embodiment of that portion of the structure of FIG. 1 delineated by line 2—2.

Referring now to FIG. 2, there is shown an alternative embodiment of the present invention. The apparatus of FIG. 2 is substantially the same as that of FIG. 1 with the exception that a helium carrier gas stream is employed and instead of monitoring the gases effusing through the skin or exhaled from the lungs, a sample of the blood stream flowing in the animal is taken from a vein, for example, and conducted through a silicone rubber fistula 25. The silicone fistula 25 is disposed inside a housing 26 through which helium gas is piped from a source of helium, not shown, to the input stage 13 of the membrane separator 6. Organic vapors effuse from the blood stream through the silicone rubber fistula or tube 25 and then into the carrier gas stream for passage to the gas separator and thence to the mass spectrometer.

The apparatus of FIG. 1 is useful for continuous monitoring of drug concentration levels in the blood stream. For example, it may be employed for monitoring the concentration of anesthetic in the blood. The anesthesiologist monitors the output of the mass spectrometer or other suitable gas analyzer and adjusts the amount of anesthetic administered to the patient. This method is especially useful for calibrating the patient before an operation. More specifically, the anesthesiologist would administer anesthetic to the patient while monitoring the amount of anesthetic in the blood and while simultaneously monitoring the degree of anesthesia of the patient. The blood level of anesthetic could then be correlated with the degree of consciousness before an operation was to be performed such that while the operation was being performed a very precise control over the depth of anesthesia of the patient could be achieved in a reliable and safe manner. Thus the level of anesthetic can be monitored without breaking the skin.

Although the apparatus of FIGS. 1 and 2 has been described as used with human subjects, this is not a requirement and it may be employed for use with other animals.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. In a method for detecting trace quantities of a drug material in a living animal under observation, the steps of obtaining a sample of gaseous material effusing from the animal under observation, passing the acquired gas to at least a first semipermeable membrane which is relatively permeable to the drug material and relatively impermeable to permanent gases to enrich the concentration of the drug vapors, if any, in the gaseous sample passing through the first membrane, passing the enriched gas sample output of the first membrane to a second semipermeable membrane which is permeable to the drug material and generally impermeable to permanent gases to further enrich the drug vapor, if any, in the gaseous sample passing through the second membrane, and passing a drug enriched gaseous output of the second membrane to a gas analyzer for detecting the drug material, if any, in the gas sample under analysis.

2. The method of claim 1 wherein the step of obtaining a sample of gaseous material effusing from the animal comprises the step of obtaining the sample of gaseous material from the exhaled breath of the animal.

3. The method of claim 1 wherein the step of obtaining a sample of gaseous material effusing from the animal comprises the step of obtaining the sample of gaseous material from a region immediately adjacent the skin of the animal.

4. The method of claim 1 wherein the gas analyzer is a mass spectrometer.

5. The method of claim 1 wherein the step of obtaining a sample of gaseous material effusing from the animal comprises the step of passing a liquid sample of a body fluid of an animal to a semipermeable membrane which is relatively permeable to the drug material and relatively impermeable to the liquid and permanent gas constituents of the body fluid, and collecting the sample of gaseous material to be analyzed from the side of the membrane remote from the liquid membrane interface.

6. The method of claim 1, including the step of passing the acquired gas sample to a third semipermeable membrane which is permeable to the drug material and relatively impermeable to permanent gas, such third membrane being disposed upstream of the first and second membranes such that the drug vapor concentration in the acquired gas sample is enriched before passage to the first membrane.

7. The method of claim 6, including the step of pumping water vapor from the sample gas stream flowing from the first to the second membranes, the pumping rate for the water vapor being at a rate which exceeds the pumping rate for the permanent gas constituents of the gas stream, whereby the water vapor concentration passing through the second membrane to the gas analyzer is substantially reduced.

8. The method of claim 1 including the steps of obtaining the sample gases over a period of time, analyzing the drug material over the period of time, and correlating the detected amount of the detected drug material with time.

9. The method of claim 8, including the steps of, administering a drug to the animal under analysis, and wherein the sample gas acquiring period includes a period following administration of the drug, and wherein the step of analyzing the gas in a gas analyzer comprises analyzing the gas for trace components of the drug, drug products or metabolic products of the administered drug, and wherein the step of correlating the detected amount of the drug material with time includes a correlation of the rate of absorption of the drug into the blood stream and the rate of excretion from the blood stream.

10. The method of claim 8, including the step of administering a drug to the animal under observation, and wherein the sample gas acquiring period includes a period following administration of the drug, and wherein the step of analyzing the gas in a gas analyzer comprises analyzing the gas for trace components of metabolic products of the administered drug.

\* \* \* \* \*